(12) United States Patent
Holmes et al.

(10) Patent No.: US 11,137,605 B1
(45) Date of Patent: *Oct. 5, 2021

(54) NEAR-EYE DISPLAY ASSEMBLY WITH ENHANCED DISPLAY RESOLUTION

(71) Applicant: Facebook Technologies, LLC, Menlo Park, CA (US)

(72) Inventors: Stephen John Holmes, Redmond, WA (US); Wanli Chi, Sammamish, WA (US); Maxwell Parsons, Berkeley, CA (US); Jasmine Soria Sears, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/796,008

(22) Filed: Feb. 20, 2020

Related U.S. Application Data

(63) Continuation of application No. 15/898,140, filed on Feb. 15, 2018, now Pat. No. 10,613,332.

(51) Int. Cl.
| | | |
|---|---|---|
| *G02B 27/01* | (2006.01) | |
| *G02B 5/30* | (2006.01) | |
| *G06F 1/16* | (2006.01) | |
| *G06F 3/01* | (2006.01) | |
| *G06F 3/00* | (2006.01) | |

(52) U.S. Cl.
CPC .......... *G02B 27/0172* (2013.01); *G02B 5/30* (2013.01); *G06F 1/163* (2013.01); *G06F 3/005* (2013.01); *G06F 3/013* (2013.01)

(58) Field of Classification Search
None
See application file for complete search history.

(56) References Cited

U.S. PATENT DOCUMENTS

| | | |
|---|---|---|
| 5,452,385 A | 9/1995 | Izumi et al. |
| 5,966,112 A | 10/1999 | Katagiri et al. |
| 6,429,913 B2 | 8/2002 | Putilin |
| 8,233,204 B1 | 7/2012 | Robbins et al. |
| 8,508,830 B1 | 8/2013 | Wang |
| 9,762,851 B1 | 9/2017 | Baumert et al. |

(Continued)

OTHER PUBLICATIONS

"4K e-shift 3 Technology I DLA-X900R/DLA-X700R/DLA-XS00R I JVC," JVC Kenwood Corporation, undated, 5 pages, [Online] [Retrieved on Mar. 19, 2018] Retrieved from the Internet <URL: http://eu.jvc.com/microsite/eu/dla-x900r/feature01.html>.

(Continued)

*Primary Examiner* — Jennifer D. Carruth
(74) *Attorney, Agent, or Firm* — Fenwick & West LLP

(57) ABSTRACT

A near-eye display assembly presented herein includes an electronic display, an optical assembly, and scanning assembly. The electronic display has a first resolution. The optical assembly controls a field of view at an eye box and directs a plurality of light rays emitting from the electronic display toward the eye box. The scanning assembly shifts a direction of at least one of the light rays in accordance with emission instructions such that a virtual display is presented to the eye box, the virtual display having a second resolution greater than the first resolution. The display assembly can be implemented as a component of a head-mounted display of an artificial reality system.

20 Claims, 9 Drawing Sheets

(56) References Cited

U.S. PATENT DOCUMENTS

| | | |
|---|---|---|
| 10,613,332 B1 * | 4/2020 | Holmes .................. G06F 1/163 |
| 10,672,310 B2 * | 6/2020 | McGlew ............ G02B 26/0833 |
| 10,677,966 B1 * | 6/2020 | Ouderkirk .......... G02B 27/0081 |
| 2002/0101643 A1 | 8/2002 | Kobayashi |
| 2004/0160535 A1 | 8/2004 | Chuman et al. |
| 2010/0245321 A1 | 9/2010 | Ogita et al. |
| 2010/0246003 A1 | 9/2010 | Simmonds et al. |
| 2010/0271537 A1 | 10/2010 | Endoh et al. |
| 2012/0235886 A1 | 9/2012 | Border et al. |
| 2013/0016413 A1 * | 1/2013 | Saeedi ............... G02B 27/0093 |
| | | 359/205.1 |
| 2013/0021226 A1 | 1/2013 | Bell |
| 2013/0314793 A1 | 11/2013 | Robbins et al. |
| 2014/0168260 A1 | 6/2014 | O'Brien et al. |
| 2015/0015818 A1 | 1/2015 | Kim et al. |
| 2015/0260995 A1 | 9/2015 | Mukawa |
| 2016/0041384 A1 | 2/2016 | Robbins et al. |
| 2016/0044276 A1 | 2/2016 | Shearman et al. |
| 2016/0048017 A1 | 2/2016 | Kasahara et al. |
| 2016/0055822 A1 | 2/2016 | Bell |
| 2016/0241217 A1 | 8/2016 | Sazegar et al. |
| 2016/0262608 A1 | 9/2016 | Krueger |
| 2016/0270656 A1 | 9/2016 | Samec et al. |
| 2016/0282635 A1 | 9/2016 | Yang et al. |
| 2016/0286204 A1 | 9/2016 | Grata et al. |
| 2016/0295202 A1 | 10/2016 | Evans et al. |
| 2016/0306171 A1 | 10/2016 | Rudolph et al. |
| 2016/0379606 A1 | 12/2016 | Kollin et al. |
| 2017/0045746 A1 | 2/2017 | Ellsworth et al. |
| 2017/0068119 A1 * | 3/2017 | Antaki ................ H04N 5/2258 |
| 2017/0068311 A1 | 3/2017 | Evans et al. |
| 2017/0097506 A1 | 4/2017 | Schowengerdt et al. |
| 2017/0131545 A1 | 5/2017 | Wall et al. |
| 2017/0351090 A1 * | 12/2017 | Sekiya ............... G02B 27/0189 |
| 2018/0203231 A1 * | 7/2018 | Glik .................. G02B 27/0103 |
| 2018/0210195 A1 | 7/2018 | Chee et al. |
| 2019/0041634 A1 | 2/2019 | Popovich et al. |
| 2019/0206134 A1 | 7/2019 | Devam et al. |

OTHER PUBLICATIONS

United States Office Action, U.S. Appl. No. 15/670,730, dated Jun. 4, 2020, 16 pages.

* cited by examiner

800

```
┌─────────────────────────────────────────────┐
│         Generate emission instructions       │
│                    810                       │
└─────────────────────────────────────────────┘
                      │
                      ▼
┌─────────────────────────────────────────────┐
│ Provide the emission instructions to a scanning assembly to shift a direction of
│ at least one light ray of a plurality of light rays emitted from an electronic display
│ and directed toward an eye box such that a virtual display is presented at the
│ eye box, the virtual display having a second resolution greater than a first
│ resolution of the electronic display
│                    820                       │
└─────────────────────────────────────────────┘
```

FIG. 8

NEAR-EYE DISPLAY ASSEMBLY WITH ENHANCED DISPLAY RESOLUTION

CROSS REFERENCE TO RELATED APPLICATIONS

This application is a continuation of co-pending U.S. application Ser. No. 15/898,140, filed Feb. 15, 2018, which is incorporated by reference in its entirety.

BACKGROUND

The present disclosure generally relates to displaying content to a user of an artificial reality system, and specifically relates to a near-eye display assembly with an enhanced display resolution.

As the requirement to simultaneously reduce a size of emissive displays and increase a resolution of emissive displays becomes more demanding, so the limitations inherent in the scaling down of display elements, including the pixels and sub-pixels, become more pronounced. Conventional approaches to increasing the resolution for a given size of emissive display or decreasing the display size for a given resolution involve reducing the space between the pixels and/or producing smaller individual pixels and hence sub-pixels. However, these approaches place increasingly harsh demands on the processing of the pixels and sub-pixels, reduces the achievable yield, and increase the total cost.

It is therefore desirable to create high resolution emissive displays without further reduction of the space between pixels and without further decreasing of a size of an individual pixel and a sub-pixel.

SUMMARY

A near-eye display assembly presented herein includes an electronic display, an optical assembly, and a scanning assembly. The electronic display has a first resolution. The optical assembly is configured control a field of view at an eye box and direct a plurality of light rays emitting from the electronic display toward the eye box. The scanning assembly is configured to shift a direction of at least one of the light rays in accordance with emission instructions such that a virtual display is presented to the eye box, the virtual display having a second resolution greater than the first resolution.

A head-mounted display (HMD) can further integrate the near-eye display assembly. The HMD displays content to a user wearing the HMD. The HMD may be part of an artificial reality system. The electronic display of the near-eye display assembly is configured to emit image light. The optical assembly of the display assembly is further configured to direct the image light to an eye box of the HMD corresponding to a location of a user's eye.

BRIEF DESCRIPTION OF THE DRAWINGS

FIG. 8 is a flow chart illustrating a process for display resolution enhancement, in accordance with one or more embodiments.

Figure 1:
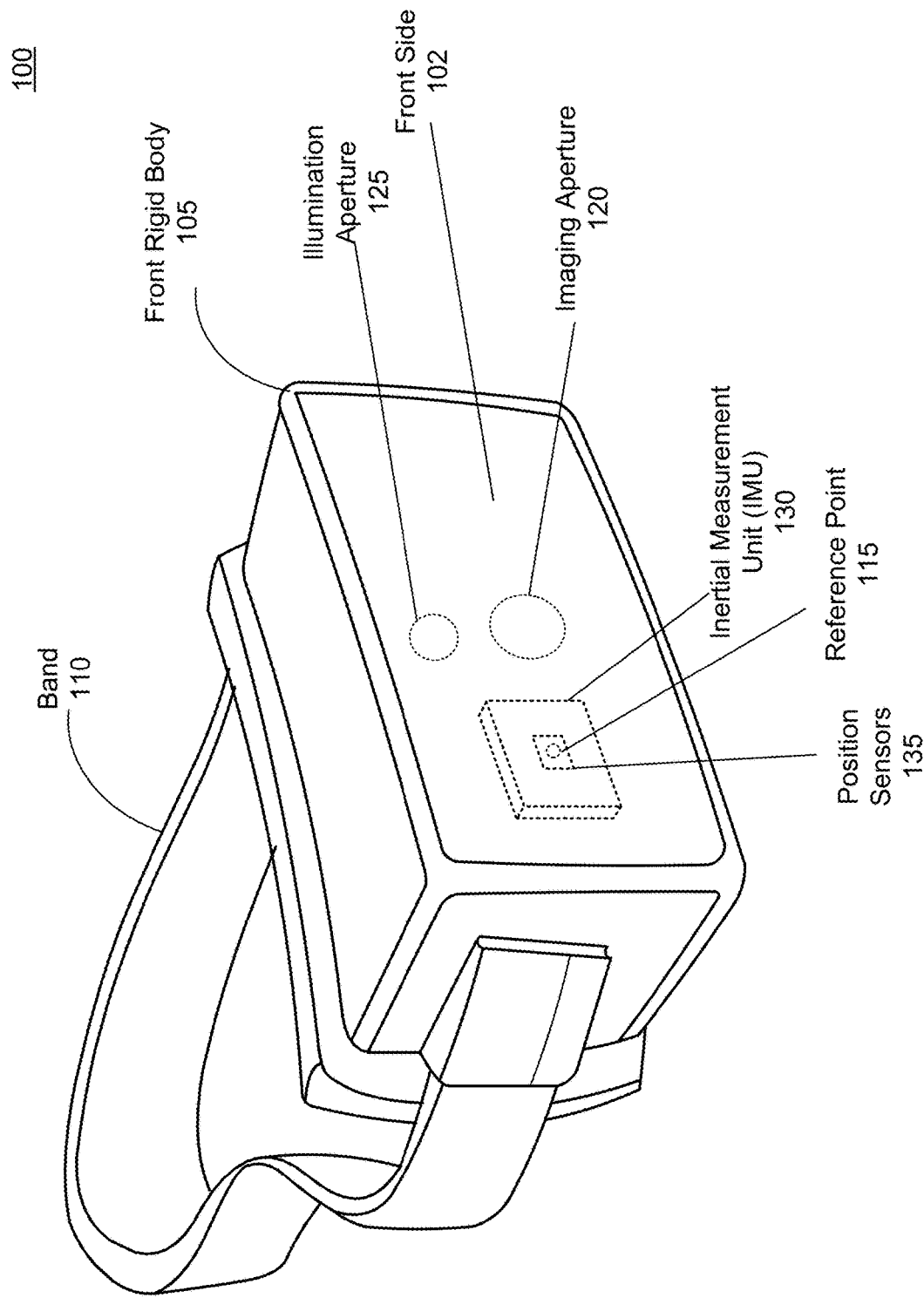
FIG. 1 is a diagram of a head-mounted display (HMD), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Emerging applications require higher resolution of emissive displays, faster frame-rates, smaller total size, lighter weight, lower-power, higher color gamut, etc. Embodiments of the present disclosure relate to an apparatus and methods for display resolution enhancement. The apparatus and methods presented herein facilitate shifting a relative position of an electronic display to an optical assembly coupled to the electronic display during scanning of the electronic display to obtain a virtual display presented to an eye box having a resolution greater than an original resolution of the electronic display.

A near-eye display assembly presented in this disclosure includes an electronic display, an optical assembly, and a scanning assembly. The electronic display is configured to emit image light. The optical assembly is configured to provide optical correction to the image light and direct the image light toward an eye box of a user's eye. An eye box can be defined as a region where an entrance pupil of a human eye can be located to perceive an acceptable quality image produced by viewing optics. The electronic display and/or optical assembly may be moved rapidly, e.g., by the scanning assembly, to increase resolution and/or brightness of the image light output by the near-eye display assembly. In some embodiments, the electronic display comprises a sparse population of pixels/sub-pixels and can be referred to as a sparsely-populated display. Note that a sub-pixel is considered herein as an emission element emitting light of a particular wavelength (color). A pixel in an electronic display is composed of multiple sub-pixels (e.g., three sub-pixels), wherein each sub-pixel in the pixel emits light of a different wavelength (different color). The sparsely-populated display may be raster-scanned to increase a perceivable resolution of the electronic display at the eye box. In other embodiments, the electronic display comprises a dense population of pixels/sub-pixels and can be referred to as a densely-populated display. The densely-populated display and/or the optical assembly coupled to the display may be moved by the scanning assembly in a circular manner such that image light from one sub-pixel overlays image light from another sub-pixel, thereby making each sub-pixel location to function as a pixel of the same size enhancing a perceived display resolution at the eye box.

In some embodiments, the near-eye display assembly is incorporated into a HMD. The HMD displays content to a user wearing the HMD. The HMD may be part of an artificial reality system. The electronic display of the near-eye display assembly is configured to emit image light. The optical assembly of the display assembly is further configured to direct the image light to an eye box of the HMD corresponding to a location of a user's eye.

FIG. 1 is a diagram of a HMD 100, in accordance with one or more embodiments. The HMD 100 may be part of an artificial reality system. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. In some embodiments, the HMD 100 may also include a depth camera assembly (DCA) configured to determine depth information of a local area surrounding some or all of the HMD 100. The HMD 100 may also include an imaging aperture 120 and an illumination aperture 125, and an illumination source of the DCA emits light (e.g., structured light) through the illumination aperture 125. An imaging device of the DCA captures light from the illumination source that is reflected from the local area through the imaging aperture 120.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates IMU data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
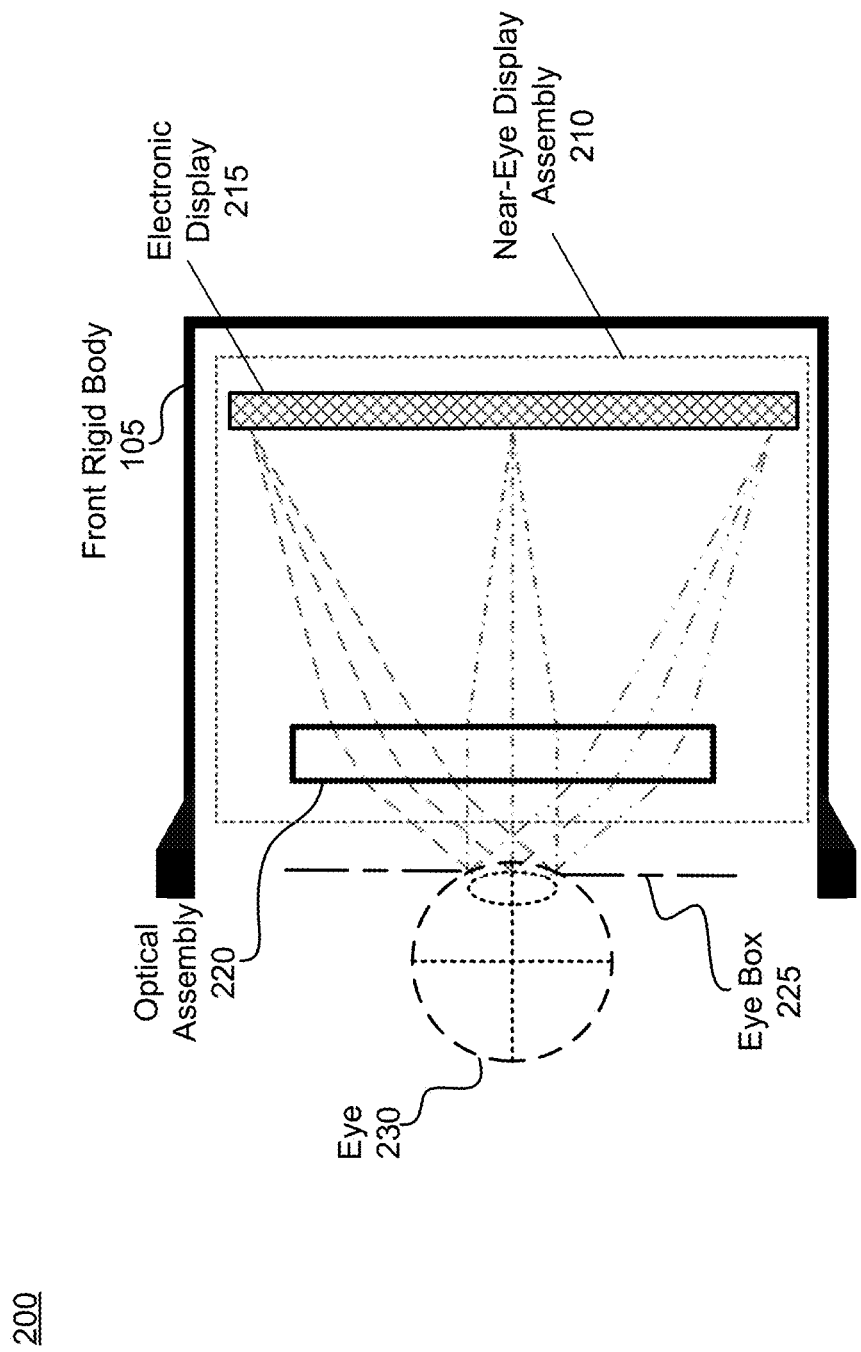
FIG. 2 is a cross section of a front rigid body of the HMD in FIG. 1, in accordance with one or more embodiments.

FIG. 2 is a cross section 200 of the front rigid body 105 of the HMD 100 shown in FIG. 1, in accordance with one or more embodiments. As shown in FIG. 2, the front rigid body 105 includes a near-eye display assembly 210 that comprises an electronic display 215 and an optical assembly 220. The near-eye display assembly 210 may be configured herein to increase resolution and/or brightness of image light output by the near-eye display assembly 210, e.g., by rapidly moving the electronic display 215 and/or one or more components of the optical assembly 220. In some embodiments, the near-eye display assembly 210 includes a two-dimensional electronic display 215 that emits image light being collimated by a lens system of the optical assembly 220 (not shown in FIG. 2). However, other architectures of the near-eye display assembly 210 are possible. The electronic display 215 and the optical assembly 220 together provide image light to an eye box 225. The eye box 225 is a region in space that is occupied by a user's eye 230. For purposes of illustration, FIG. 2 shows a cross section 200 associated with a single eye 230, but another optical assembly 220, separate from the optical assembly 220, provides altered image light to another eye of the user.

The electronic display 215 emits image light toward the optical assembly 220. In various embodiments, the electronic display 215 may comprise a single electronic display or multiple electronic displays (e.g., a display for each eye of a user). Examples of the electronic display 215 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 215 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 215. In some embodiments, the electronic display 215 may have one or more coatings, such as anti-reflective coatings. More details about architecture of the electronic display 215 and operation of the electronic display 215 within the near-eye display assembly 210 are provided in conjunction with FIGS. 3-7.

The optical assembly 220 receives image light emitted from the electronic display 215 and directs the image light to the eye box 225 of the user's eye 230. The optical assembly 220 also magnifies the received image light, corrects optical aberrations associated with the image light, and the corrected image light is presented to a user of the HMD 100. In some embodiments, the optical assembly 220 includes a collimation element (lens) for collimating beams of image light emitted from the electronic display 215. At least one optical element of the optical assembly 220 may be an aperture, a Fresnel lens, a refractive lens, a reflective surface, a diffractive element, a waveguide, a filter, or any other suitable optical element that affects image light emitted from the electronic display 215. Moreover, the optical assembly 220 may include combinations of different optical elements. In some embodiments, one or more of the optical elements in the optical assembly 230 may have one or more coatings, such as anti-reflective coatings, dichroic coatings, etc. Magnification of the image light by the optical assembly 220 allows elements of the electronic display 215 to be physically smaller, weigh less, and consume less power than larger displays. Additionally, magnification may increase a field-of-view (FOV) of the displayed media. For example, the FOV of the displayed media is such that the displayed media is presented using almost all (e.g., 110 degrees diagonal), and in some cases all, of the user's FOV. In some embodiments, the optical assembly 220 is designed so its effective focal length is larger than the spacing to the electronic display 215, which magnifies the image light projected by the electronic display 215. Additionally, in some embodiments, the amount of magnification may be adjusted by adding or removing optical elements. More details about the optical assembly 220 and operation of the optical assembly 220 within the near-eye display assembly 210 are described in conjunction with FIG. 3, FIG. 5 and FIG. 7.

In some embodiments, the front rigid body 105 further comprises an eye tracking system (not shown in FIG. 2) that determines eye tracking information for the user's eye 230. The determined eye tracking information may comprise information about a position (including orientation) of the user's eye 230 in the eye box 225, i.e., information about an angle of an eye-gaze. In one embodiment, the eye tracking system illuminates the user's eye 230 with structured light. The eye tracking system can use locations of the reflected structured light in a captured image to determine the position of the user's eye 230. In another embodiment, the eye tracking system determines the position of the user's eye 230 based on magnitudes of image light captured over a plurality of time instants.

In some embodiments, the front rigid body 105 further comprises a varifocal module (not shown in FIG. 2). The varifocal module may adjust focus of one or more images displayed on the electronic display 215, based on the eye tracking information obtained from the eye tracking system. In one embodiment, the varifocal module adjusts focus of the displayed images and mitigates vergence-accommodation conflict by adjusting a focal distance of the optical assembly 220 based on the determined eye tracking information. In other embodiment, the varifocal module adjusts focus of the displayed images by performing foveated rendering of the one or more images based on the determined eye tracking information.

Figure 3:
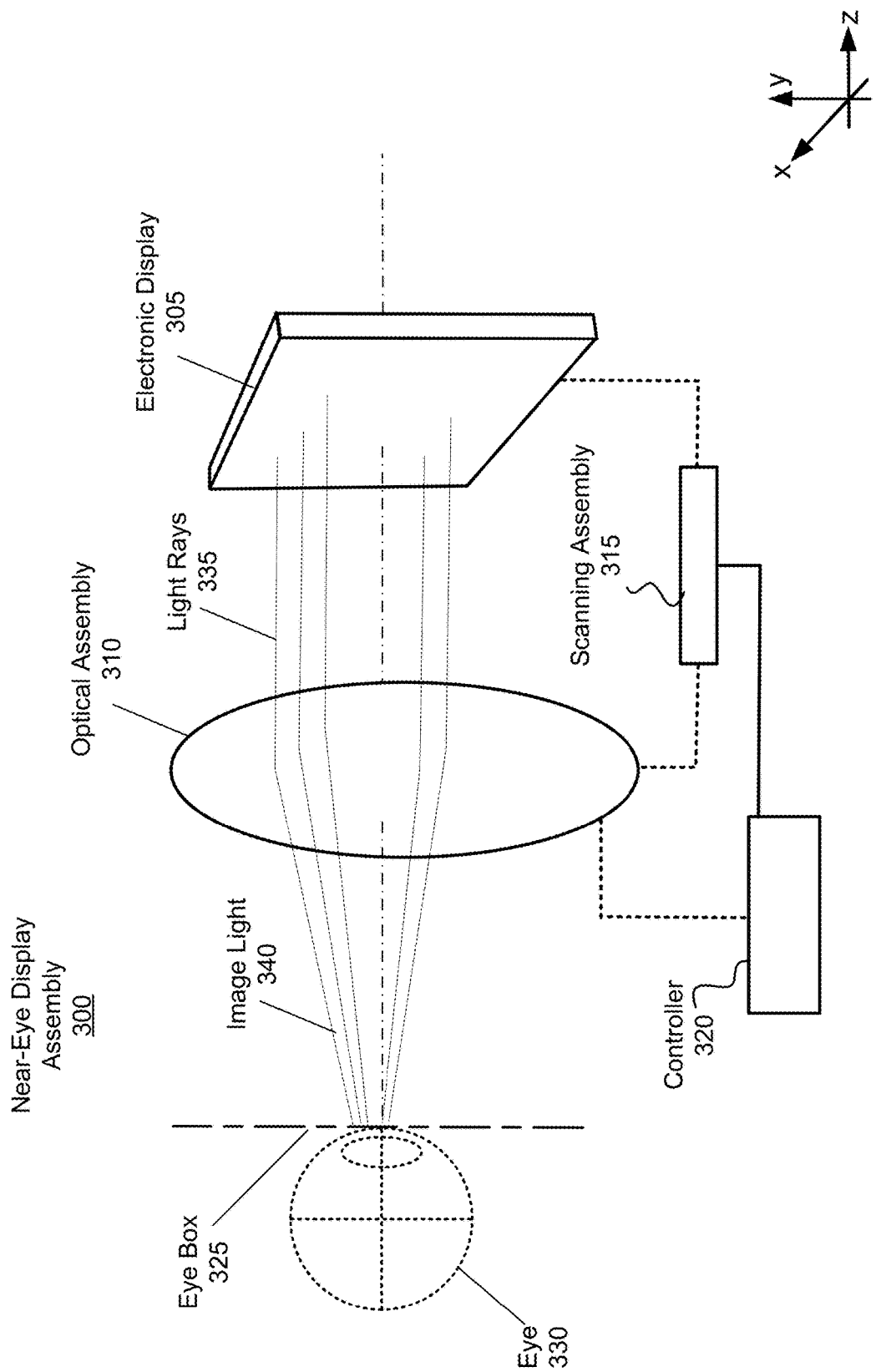
FIG. 3 illustrates an example near-eye display assembly with an electronic display, an optical assembly, a scanning assembly and a controller, which may be part of the HMD in FIG. 1, in accordance with one or more embodiments.

FIG. 3 illustrates an example near-eye display assembly 300, in accordance with one or more embodiments. The near-eye display assembly 300 may be configured herein to increase resolution and/or brightness of image light output by the near-eye display assembly 300. The near-eye display assembly 300 includes an electronic display 305, an optical assembly 310, a scanning assembly 315 coupled to at least one or both of the electronic display 305 and the optical assembly 310, and a controller 320 coupled to the scanning assembly 315. The near-eye display assembly 300 may be part of the HMD 100 in FIG. 1. Furthermore, the near-eye display assembly 300 may be part of a HMD implemented as an eyeglass-type platform. In this case, the electronic display 305 of the near-eye display assembly 300 may be also implemented as a waveguide based display. Additional details regarding artificial reality systems implemented as eyeglass-type platforms and waveguide based displays are discussed in, e.g., U.S. application Ser. No. 15/863,689, filed Jan. 5, 2018, U.S. application Ser. No. 15/682,294, filed Aug. 21, 2017, U.S. application Ser. No. 15/670,730, filed Aug. 7, 2017, and are herein incorporated by reference in their entireties. The near-eye display assembly 300 may be an embodiment of the near-eye display assembly 210 in FIG. 2; the electronic display 305 may be an embodiment of the electronic display 215 in FIG. 2; and the optical assembly 310 may be an embodiment of the optical assembly 220 in FIG. 2.

The electronic display 305 emits image light, e.g., based in part on emission instructions from the controller 320. In one embodiment, the electronic display 305 is implemented as an OLED display. In other embodiment, the electronic display 305 is implemented as an ILED display. However, other implementations of the electronic display 305 are also possible. The electronic display 305 may comprise a two-dimensional array of emission elements. Each emission element of the electronic display 305 may be implemented as a sub-pixel (not shown in FIG. 3) emitting light of a particular wavelength (color). For example, a sub-pixel of the electronic display 305 may emit red light, green light, or blue light. A pixel of the electronic display 305 may be composed of multiple sub-pixels (e.g., three sub-pixels), wherein each sub-pixel in the pixel emits light of a different color. In some embodiments, the electronic display 305 is implemented as a full color display having a resolution of N pixels in a first dimension (e.g., x dimension) and M pixels in a second dimension (e.g., y dimension), i.e., a resolution of N×M pixels, where N and M are integers. The electronic display 305 may be thus composed of two-dimensional array of sub-pixels, wherein three consecutive sub-pixels in the electronic display 305 (e.g., along x dimension or y dimension) emitting light of different colors form a pixel of the electronic display 305 emitting white light of a particular intensity (brightness).

In some embodiments, a resolution of the electronic display 305 may be below a threshold resolution, i.e., a number of pixels in each dimension may be below a threshold number per unit distance. In other embodiments, a resolution of the electronic display 305 may be above the threshold resolution, i.e., the number of pixels in each dimension may be above the threshold number per unit distance. The electronic display 305 can be referred to as a sparsely-populated electronic display when a distance between adjacent sub-pixels is at least a size of an emission area of a sub-pixel (and in many cases is multiple times larger than the size of the emission area of the sub-pixel). The electronic display 305 can be referred to as a densely-populated electronic display when a distance between adjacent sub-pixels is less than an emission area of a sub-pixel. In one or more embodiments, each sub-pixel position in the electronic display 305 may be occupied by one emission element or sub-pixel. The electronic display 305 can be then referred to as a fully-populated electronic display, which can be considered to be a special case of a densely-populated electronic display. In general, the electronic display 305 is implemented herein to have a first resolution of pixels. More details about a pixel/sub-pixel arrangement within the electronic display 305 are provided in conjunction with FIG. 4 and FIG. 6.

The optical assembly 310 controls a FOV at an eye box 325 of an eye 330 and directs a plurality of light rays 335 of image light emitting from the electronic display 305 toward the eye box 325. The scanning assembly 315 is configured to shift directions of the light rays 335 in accordance with emission instructions (e.g., provided by the controller 320) such that a virtual display is presented to the eye box 325, wherein the virtual display (not shown in FIG. 3) has a second resolution greater than the first resolution of the electronic display 305. Thus, a resolution of image light 340 presented to the eye box 325 may be greater than that of the light rays 335. In addition, a level of brightness (intensity) of the image light 340 at the eye box 325 may be increased relative to a level of brightness of the light rays 335 when being emitted from the electronic display 305. In an exemplary embodiment, the scanning assembly 315 is configured to shift a direction of at least one of the light rays 335 in accordance with the emission instructions, wherein the second resolution of the virtual display presented to the eye box 325 may be increased by at least one virtual pixel relative to the first resolution of the electronic display 305. More details about principles utilized to increase resolution and/or brightness as being perceived at the eye box 325 is provided in conjunction with FIG. 5 and FIG. 7.

In some embodiments, the optical assembly 310 includes one or more electro-optical elements (not shown in FIG. 3). In one or more embodiments, the one or more electro-optical elements of the optical assembly 310 include one or more electro-optical liquid deformable surfaces. Operation of the one or more electro-optical elements in the optical assembly 310 may be controlled based in part on, e.g., the emission instructions from the controller 320 to shift the directions of the light rays 335 emitted from the electronic display 305 to increase resolution and/or brightness of the image light 340 at the eye box 325. In some other embodiments, the optical assembly 310 includes an optical prism, e.g., a fine wedge-shaped prism (not shown in FIG. 3). In one or more embodiments, the prism in the optical assembly 310 can be implemented as a spinning small angle prism, wherein a spinning angle of the prism can be controlled based in part on, e.g., the emission instructions from the controller 325. By rotating the prism in the optical assembly 310 around an optical axis of the optical assembly 310 (e.g., based in part on the emission instructions from the controller 320), the directions of the light rays 335 emitted from the electronic display 305 are shifted, thereby increasing resolution and/or brightness of the image light 340 at the eye box 325. In yet some other embodiments, the optical assembly 310 includes a collimation element or lens (not shown in FIG. 3) configured to collimate the light rays 335 received from the electronic display 305. By rotating the collimation element in the optical assembly 310 around an optical axis of the optical assembly 310 (e.g., based in part on the emission instructions from the controller 320), the directions of the light rays 335 emitted from the electronic display 305 are shifted, thereby increasing resolution and/or brightness of the image light 340 at the eye box 325.

In some embodiments, the scanning assembly 315 is configured to shift the directions of the light rays 335 emitted from the electronic display 305 by shifting a relative position of the electronic display 305 to the optical assembly 310 in accordance with the emission instructions (e.g., from the controller 320) at each time sample of a plurality of time samples in a time period of scanning the electronic display 305. The scanning assembly 315 may include at least one positioner coupled to the electronic display 305 for rapidly moving the electronic display 305 and/or at least one component (e.g., lens) of the optical assembly 310 along x dimension and/or y dimension during the scanning, thereby shifting the relative position of the electronic display 305 to the optical assembly 310 and increasing resolution and/or brightness of image light at the eye box 325. In one or more embodiments, each positioner of the scanning assembly 315 is implemented as a micro-actuator configured to move the electronic display 305 and/or the at least one component of the optical assembly 310, based in part on, e.g., the emission instructions from the controller 320, thereby increasing resolution and/or brightness of the image light 340 at the eye box 325. Furthermore, in one embodiment, the at least one positioner of the scanning assembly 315 is configured to rotate the prism of the optical assembly 310 around an axis of the optical assembly 310 (e.g. based in part on the emission instructions from the controller 320) to shift the directions of the light rays 335 emitted from the electronic display 305, thereby increasing resolution and/or brightness of the image light 340 at the eye box 325. In other embodiment, the at least one positioner of the scanning assembly 315 is configured to rotate the collimation element of the optical assembly 310 around an axis of the optical assembly 310 (e.g. based in part on the emission instructions from the controller 320) to shift the directions of the light rays 335 emitted from the electronic display 305, thereby increasing resolution and/or brightness of the image light 340 at the eye box 325. In some other embodiments, the at least one positioner of the scanning assembly 315 can be configured to shift the electronic display 305 and/or the at least one component of the optical assembly 310 and to rotate at least one other component of the optical assembly 310 during a time period (or control in some other manner operation of the other component of the optical assembly 310), thereby shifting directions of the light rays 335 emitted from the electronic display 305 and increasing resolution and/or brightness of the image light 340 at the eye box 325.

The controller 320 generates emission instructions for one or more components of the near-eye display assembly 300. The electronic display 305 may emit the plurality of light rays in accordance with the emission instructions from the controller 320. In some embodiments, the controller 320 is coupled, via the scanning assembly 315, to at least one of the electronic display 305 and the optical assembly 310. Thus, the scanning assembly 315 may operate as an electrical or electro-mechanical interface between the controller 320 and at least one of the electronic display 305 and the optical assembly 310.

In some embodiments, the controller 320 instructs at least one positioner of the scanning assembly 315 (e.g., at least one micro-actuator) to shift the relative position of the electronic display 305 to the optical assembly 310 during the time period of raster scanning, based in part on the emission instructions, thereby increasing resolution and/or brightness of the image light 340 at the eye box 325. In one or more embodiments, the controller 320 instructs the at least one positioner in the scanning assembly 315 to shift the electronic display 305 and/or the optical assembly 310 along x dimension and/or y dimension during the time period, based in part on the emission instructions. In some embodiments, when the electronic display 315 is implemented as a sparsely populated display, the controller 320 instructs the at least one positioner in the scanning assembly 315 to move the electronic display 305 and/or the optical assembly 310 along x dimension and y dimension during the time period, based in part on the emission instructions. In this manner, the scanning assembly 315 would shift the electronic display 305 and/or the optical assembly 310 in orthogonal directions to provide raster scanning and populate the virtual display presented to the eye box 325 with an increased sub-pixel/pixel resolution. More details about this approach for increasing display resolution are provided in conjunction with FIGS. 4-5. In other embodiments, when the electronic display 305 is implemented as a densely-populated display, the controller 320 instructs, based in part on the emission instructions, the scanning assembly 315 to translate the electronic display 305 and/or the optical assembly 310 linearly along orthogonal paths (i.e., x and y dimensions) using at least one positioner of the scanning assembly 315 to effectively shift the electronic display 305 and/or the optical assembly 310 around in a circular path during a time period of translational movement. In this manner, the densely-populated electronic display 315 is presented at the at the eye box 325 as the virtual display having an increased sub-pixel/pixel resolution. More details about this approach for increasing display resolution are provided in conjunction with FIGS. 6-7.

Furthermore, in one embodiment, the controller 320 is configured to instruct the at least one positioner of the scanning assembly 315 to rotate the prism within the optical assembly 310 around an axis of the optical assembly 310 to shift the directions of the light rays 335, based in part on the emission instructions, thereby increasing resolution and/or brightness of the image light 340 at the eye box 325. In other embodiment, the controller 320 instructs the at least one positioner of the scanning assembly 315 to rotate the collimation element of the optical assembly 310 around an axis of the optical assembly 310 to shift the directions of the light rays 335, based in part on the emission instructions, thereby increasing resolution and/or brightness of the image light 340 at the eye box 325.

In one or more embodiments, the controller 320 is directly interfaced with one or more components of the optical assembly 310. In one or more embodiments, the controller 320 is directly interfaced with one or more electro-optical elements of the optical assembly 310, e.g., one or more electro-optical liquid deformable surfaces. The controller 320 may be then configured to control operation of the one or more electro-optical elements in the optical assembly 310 based in part on the emission instructions to shift the directions of the light rays 335 emitted from the electronic display 305, thereby increasing resolution and/or brightness of the image light 340 at the eye box 325. For example, the controller 320 may control, based in part on the emission instructions, a level of voltage applied to each electro-optical liquid deformable surface in the optical assembly 310 to change a refractive index of that surface and shift the directions of the light rays 335 emitted from the electronic display 305. In other embodiments, the controller 320 is configured to control, based in part of the emission instructions, operation of the scanning assembly 315 (e.g., of the at least one positioner in the scanning assembly 315) to control a brightness of a virtual pixel of the virtual display at the eye box 325 based on a number of times over a time period a location at the eye box 325 corresponding to the virtual pixel receives one or more light rays of the plurality of light rays 335 associated with a particular sub-pixel color emitted from the electronic display 305.

Furthermore, in some embodiments, when the electronic display 315 is implemented as a sparsely populated display, the controller 320 instructs the at least one positioner of the scanning assembly 315 during a time period to control operation of at least one component (e.g., prism, collimation element, or electro-optical element) of the optical assembly 310 as well as to rapidly move the electronic display 305 and/or at least one other component of the optical assembly 310 along x dimension and y dimension, based in part on the emission instructions. In this manner, the sparsely-populated electronic display 315 is presented at the at the eye box 325 as the virtual display having an increased sub-pixel/pixel resolution. In some other embodiments, when the electronic display 315 is implemented as a densely-populated display, the controller 320 instructs the at least one positioner of the scanning assembly 315 during the time period to control operation of at least one component (e.g., prism, collimation element, or electro-optical element) of the optical assembly 310 as well as to rapidly translate the electronic display 305 and/or at least one other component the optical assembly 310 linearly along orthogonal paths to effectively shift the electronic display 305 and/or the optical assembly 310 around in a circular path, based in part on the emission instructions. In this manner, the densely-populated electronic display 315 is presented at the at the eye box 325 as the virtual display having an increased sub-pixel/pixel resolution.

Figure 4:
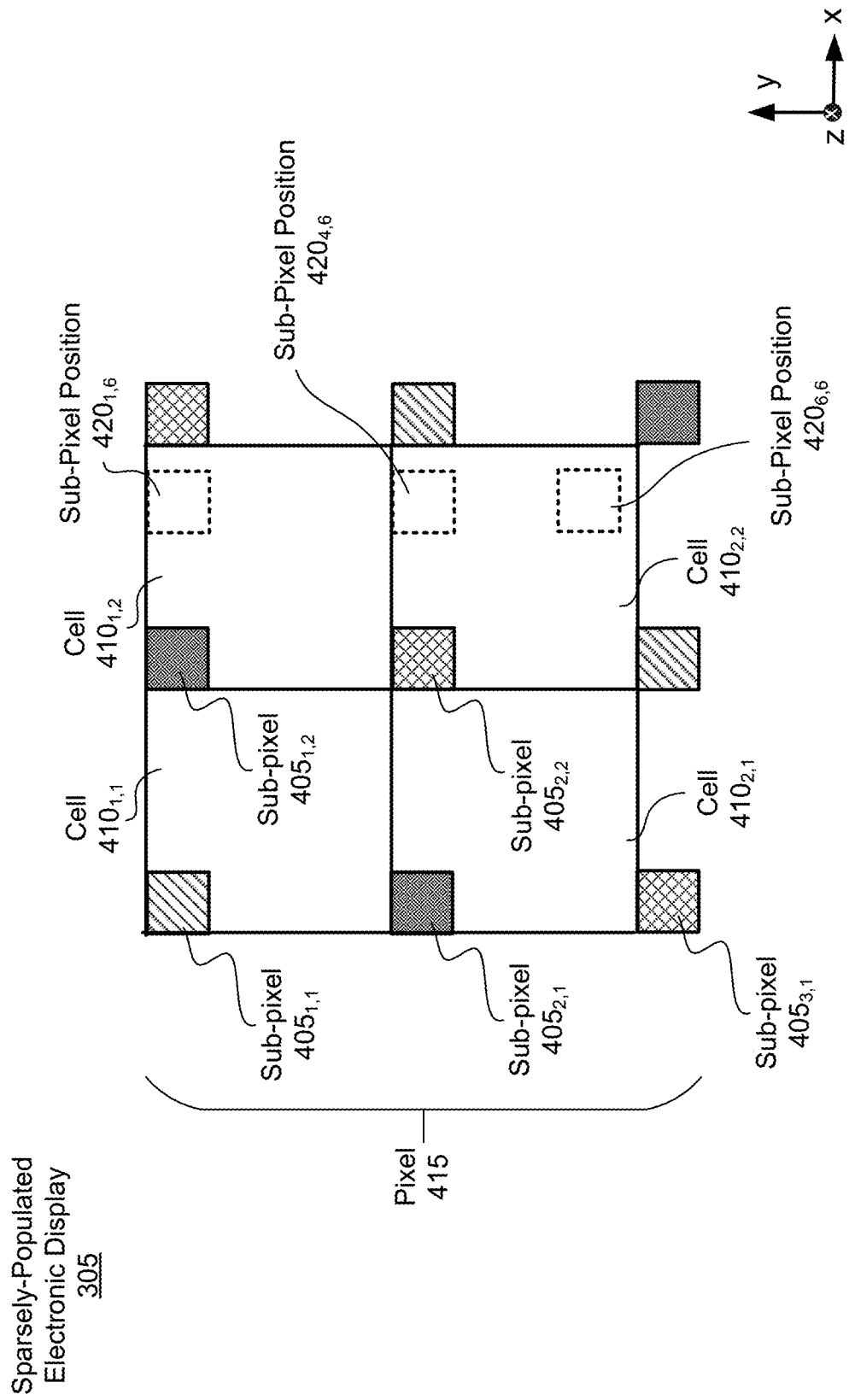
FIG. 4 is an example pixel/sub-pixel arrangement for a portion of a sparsely-populated electronic display, in accordance with one or more embodiments.

FIG. 4 is an example pixel/sub-pixel arrangement for a portion of the electronic display 305, which is implemented as a sparsely-populated electronic display, in accordance with one or more embodiments. The sparsely-populated electronic display 305 comprises a plurality of sub-pixels $405_{i,j}$, i=1, 2, 3, . . . , N and j=1, 2, . . . , M. The electronic display 305 (portion of which is shown in FIG. 4) is referred to as a sparsely-populated electronic display since a distance between adjacent sub-pixels $405_{i,j}$ and $405_{i,j+1}$ (or $405_{i,j}$ and $405_{i+1,j}$) is larger than a size of an emission area of a sub-pixel $405_{i,j}$. Note that, for simplicity and without losing generality, an emission area of a sub-pixel $405_{i,j}$ is referred to as the sub-pixel $405_{i,j}$ in FIG. 4. Each sub-pixel $405_{i,j}$ is located in a different cell $410_{i,j}$. Each cell $4101$ may occupy a two-dimensional area (e.g., square-shaped area) with sub-pixel positions (e.g., three sub-pixel positions) along x and y dimensions. As shown in FIG. 4, each sub-pixel $405_{i,j}$ is located in an upper left sub-pixel position within a cell $410_{i,j}$. However, other positions of a sub-pixel $405_{i,j}$ within a cell $410_{i,j}$ are possible. In some embodiments, for the multi-chromatic sparsely-populated electronic display 305, each sub-pixel $405_{i,j}$ is implemented to emit light of a particular color (e.g., red, green or blue color). Three consecutive sub-pixels (either along x dimension or along y dimension) emitting light of different colors (e.g., red, green and blue colors) represent a pixel 415 of the sparsely-populated electronic display 305. For example, as shown in FIG. 4, the pixel 415 is composed of sub-pixels $405_{1,1}$, $405_{2,1}$, and $405_{3,1}$ of different color channels. In some other embodiments, for the monochromatic sparsely-populated electronic display 305, each sub-pixel $405_{i,j}$ is implemented to emit light of the same color.

In the illustrative embodiment shown in FIG. 4, each sub-pixel $405_{i,j}$ (i=1, 2; j=1, 2) would fill 36 different sub-pixel positions $420_{m,n}$ (m=1, 2, . . . , 6; n=1, 2, . . . , 6), e.g., 9 sub-pixel positions in each cell $410_{i,j}$. In this manner, a space that spans adjoining cells $410_{i,j}$ (i=1, 2; j=1, 2) shown in FIG. 4 is filled by a densely-populated array of sub-pixels where each sub-pixel position $420_{m,n}$ in a cell $410_{i,j}$ is occupied by one sub-pixel $405_{i,j}$ during raster scanning. A number of different sub-pixel positions to be filled in each cell $4101_{i,j}$ during raster scanning can be different in different embodiments. At a beginning of raster scanning, each sub-pixel $405_{i,j}$ is located at an initial position, e.g., an upper left sub-pixel position within a cell $410_{i,j}$. During the raster scanning, that sub-pixel $405_{i,j}$ would fill every sub-pixel position $420_{m,n}$ in six columns and six rows adjacent to the initial position during a time period of the raster scanning (e.g., sub-pixel positions $420_{1,6}$, $420_{4,6}$, $420_{6,6}$ in FIG. 4 are example raster locations of each sub-pixel $405_{i,j}$), as discussed in more details in conjunction with FIG. 5.

In some embodiments, as discussed in conjunction with FIG. 3, the sparsely-populated electronic display 305 can be perceived as a fully populated virtual display presented to the eye box 325 by shifting directions of the light rays 335 emitted from the sparsely-populated electronic display 305. The directions of the light rays 335 may be shifted by shifting a relative position of the sparsely-populated electronic display 305 to the optical assembly 310 (not shown in FIG. 4) in accordance with emission instructions at each time sample of a plurality of time samples in a time period of raster scanning. The relative position of the sparsely-populated electronic display 305 to the optical assembly 310 may be shifted along x dimension and y dimension in a pattern that allows rendering of an image at a resolution of a densely-populated display, as being perceivable at the eye box 325.

Figure 5:
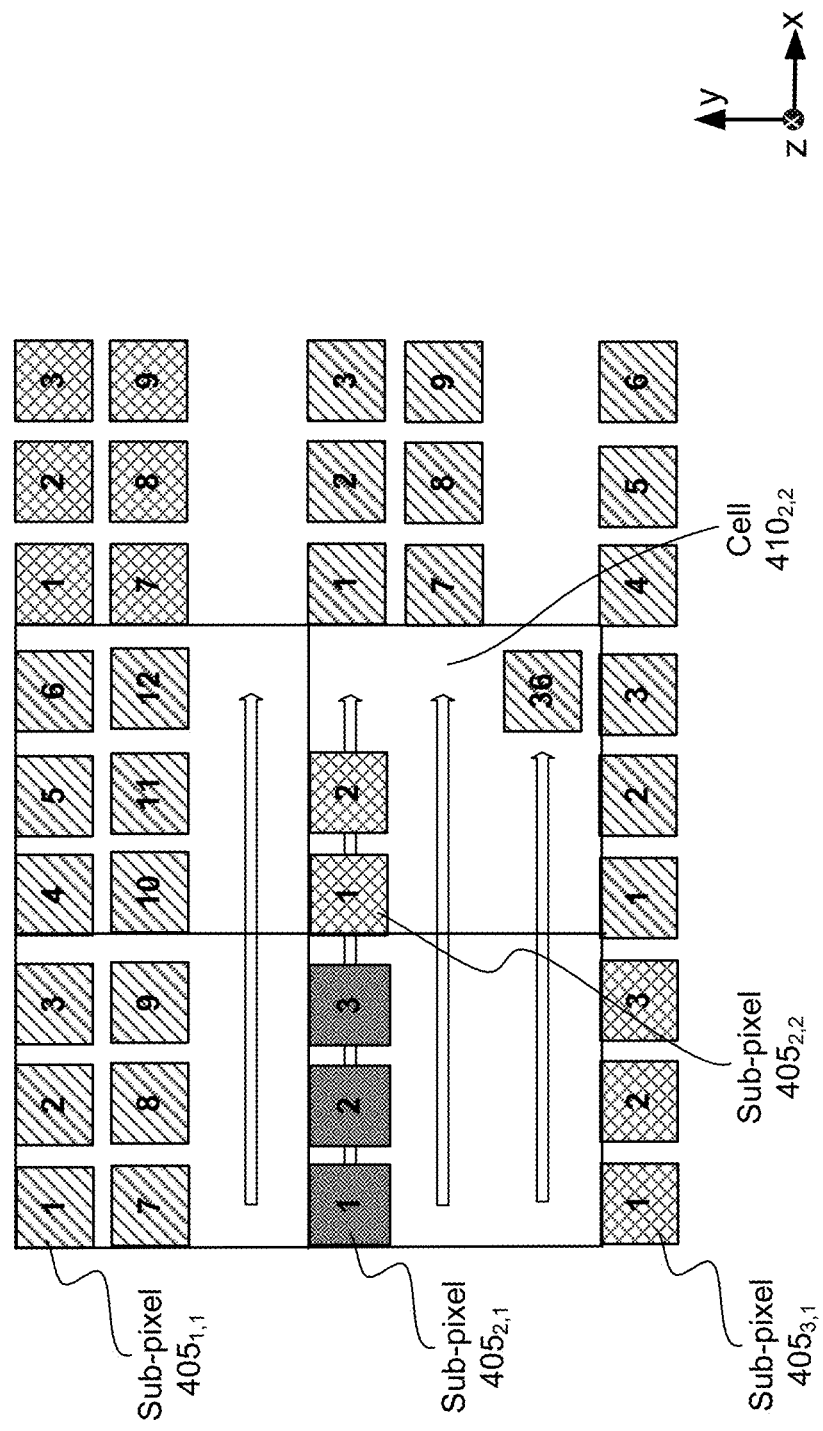
FIG. 5 illustrates an example raster-scanning motion path associated with the sparsely-populated electronic display in FIG. 4 to fully populate a virtual display presented to an eye box, in accordance with one or more embodiments.

FIG. 5 illustrates an example 500 of a raster-scanning motion path associated with the sparsely-populated electronic display 305 to fully populate a virtual display presented to the eye box 325, in accordance with one or more embodiments. Numbers 1, 2, . . . , 36 shown in FIG. 5 represent optical locations of each sub-pixel $405_{i,j}$ starting from an initial position (i.e., location 1) as the array of sub-pixels $405_{i,j}$ (i=1, 2, 3, . . . , N and j=1, 2, . . . , M) is raster scanned during a given time period. Each of the numbers 1, 2, . . . , 36 shown in FIG. 5 thus represents an optical location of each sub-pixel $405_{i,j}$ at a particular time sample of the time period of raster scanning. Note that the optical locations 1, 2, . . . , 36 in FIG. 5 are associated with sub-pixel positions $420_{m,n}$ (m=1, 2, . . . , 6; n=1, 2, . . . , 6) of FIG. 4 occupied by a sub-pixel $405_{i,j}$ during raster scanning. In the illustrative embodiment of FIG. 5, the time period of raster scanning is composed of 36 time samples. However, this may be different for different embodiments. Note that only a portion of raster-scanning motion path of each sub-pixel $405_{i,j}$ is illustrated in FIG. 5 for the sake of clarity.

The scanning assembly 315 of the near-eye display assembly of FIG. 3 is configured to shift the directions of the light rays emitted from the sparsely-populated electronic display 305 by shifting a relative position of the sparsely-populated electronic display 305 to the optical assembly 310 in accordance with the emission instructions by one sub-pixel position in the cell $410_{i,j}$ at each time sample of a plurality of time samples in a time period of raster scanning. In some embodiments, the scanning assembly 315 shifts the sparsely-populated electronic display 305 in accordance with the emission instructions along x dimension or y dimension at each time sample during the time period of raster-scanning. As shown in FIG. 5, the sparsely-populated electronic display 305 is shifted along x dimension or y dimension by one sub-pixel position at each time sample during the time period of raster scanning. Ensuring that sub-pixels are switched appropriately at each time sample of the time period of raster scanning to render images correctly (e.g., via electronic drivers in the scanning assembly 315), the light rays are emitted from each sub-pixel position of the sparsely-populated electronic display 305 along x dimension and y dimension. Thus, the sparsely-populated electronic display 305 is essentially transformed into a fully populated virtual display presented to the eye box 325.

In some embodiments, for the multi-chromatic sparsely-populated electronic display 305, the scanning is fast enough such that the eye 330 integrates light from three different neighboring sub-pixels of different color channels (e.g., sub-pixels $405_{i,j}$, $405_{i+1,j}$ and $405_{i+1,j+1}$) that occupy the same sub-pixel position (e.g., upper-left corner) in a cell (e.g., cell $410_{i+1,j+1}$) at different time instants. The three different sub-pixels occupying the same sub-pixel position in the cell at different time instants would form a virtual RGB sub-pixel of the same size as a single color channel sub-pixel $405_{i,j}$. In this manner, a virtual RGB sub-pixel representing a white pixel can be provided at a sub-pixel position of the sparsely-populated electronic display 305. This would be the case for majority of sub-pixels $405_{i,j}$ of the sparsely-populated electronic display 305, whereas the exception is the periphery of the sparsely-populated electronic display 305 where there will only be at most two color channels per virtual sub-pixel. In some other embodiments, for the monochromatic sparsely-populated electronic display 305, the eye 330 integrates light from three different neighboring sub-pixels (e.g., sub-pixels $405_{i,j}$, $405_{i+1,j}$ and $405_{i+1,j+1}$) that occupy a sub-pixel position (e.g., upper-left corner) in a cell (e.g., cell $410_{i+1,j+1}$) at different time instants such that a brightness of light emitted from the sub-pixel position is increased.

In the illustrative embodiment of FIG. 5, the sub-pixel $405_{1,1}$ of a first color channel occupies the upper-left sub-pixel position of the cell $410_{2,2}$ in the time instant 22 of the scanning time period (e.g., each scanning time period having 36 time instants); the sub-pixel $405_{2,1}$ of a second color channel occupies the upper-left sub-pixel position of the cell $410_{2,2}$ in the time instant 4 of the scanning time period; and the sub-pixel $405_{2,2}$ of a third color channel occupies the upper-left sub-pixel position of the cell $410_{2,2}$ in the first time instant of the scanning time period. Thus, the three different sub-pixel $405_{1,1}$, $405_{2,1}$, and $405_{2,2}$ occupies the same sub-pixel position at different time instants and form a virtual RGB sub-pixel. The eye 330 integrates light from three different color channels, and perceives the intergraded light as emitted from a single virtual RGB sub-pixel. A plurality of virtual RGB sub-pixels make up the virtual display with enhanced resolution at the eye box 325.

In other embodiments, as discussed in conjunction with FIG. 3, the same effect of enhanced resolution at the eye box 325 can be achieved when the scanning assembly 315 shifts a relative position of the sparsely-populated electronic display 305 to the optical assembly 310 in accordance with the emission instructions by shifting the optical assembly 310 along x dimension or y dimension at each time sample during the time period of raster-scanning. The optical assembly 310 coupled to the sparsely-populated electronic display 305 may be shifted along x dimension or y dimension by one sub-pixel position in a cell $410_{i,j}$ at each time sample during the time period of raster scanning. In this manner, directions of each light ray emitted from the sparsely-populated electronic display 305 is optically shifted by one sub-pixel position at each time sample during the time period of raster scanning. Ensuring that sub-pixels are switched appropriately at each time sample of the time period of raster scanning to render images correctly (e.g., via electronic drivers in the scanning assembly 315), light rays are emitted from each sub-pixel position of the sparsely-populated electronic display 305 along x dimension and y dimension. Thus, by moving one or more components of the optical assembly 310, the sparsely-populated electronic display 305 is essentially transformed into a fully populated virtual display presented to the eye box 325.

In yet other embodiments, as discussed in conjunction with FIG. 3, the controller 320 controls operation of the one or more electro-optical elements of the optical assembly 310 (e.g., one or more electro-optical liquid deformable surfaces) to shift directions of light rays emitted from the sparsely-populated electronic display 305 along x dimension or y dimension by one sub-pixel position at each time sample during the time period of raster-scanning. Ensuring that sub-pixels are switched appropriately at each time sample of the time period of raster scanning to render images correctly (e.g., via electronic drivers in the scanning assembly 315), light rays are emitted from each sub-pixel position of the sparsely-populated electronic display 305 along x dimension and y dimension. Thus, by controlling operation of one or more electro-optical elements of the optical assembly 310, the sparsely-populated electronic display 305 is essentially transformed into a fully populated virtual display presented to the eye box 325. In yet other embodiments, the controller 320 controls operation of the one or more electro-optical elements of the optical assembly 310 in combination with instructing the scanning assembly 315 to move the sparsely-populated electronic display 305 and/or the optical assembly 310 for performing the raster-scanning motion path shown in FIG. 5, such that a resolution of a virtual display presented at the eye box 325 is enhanced.

Figure 6:
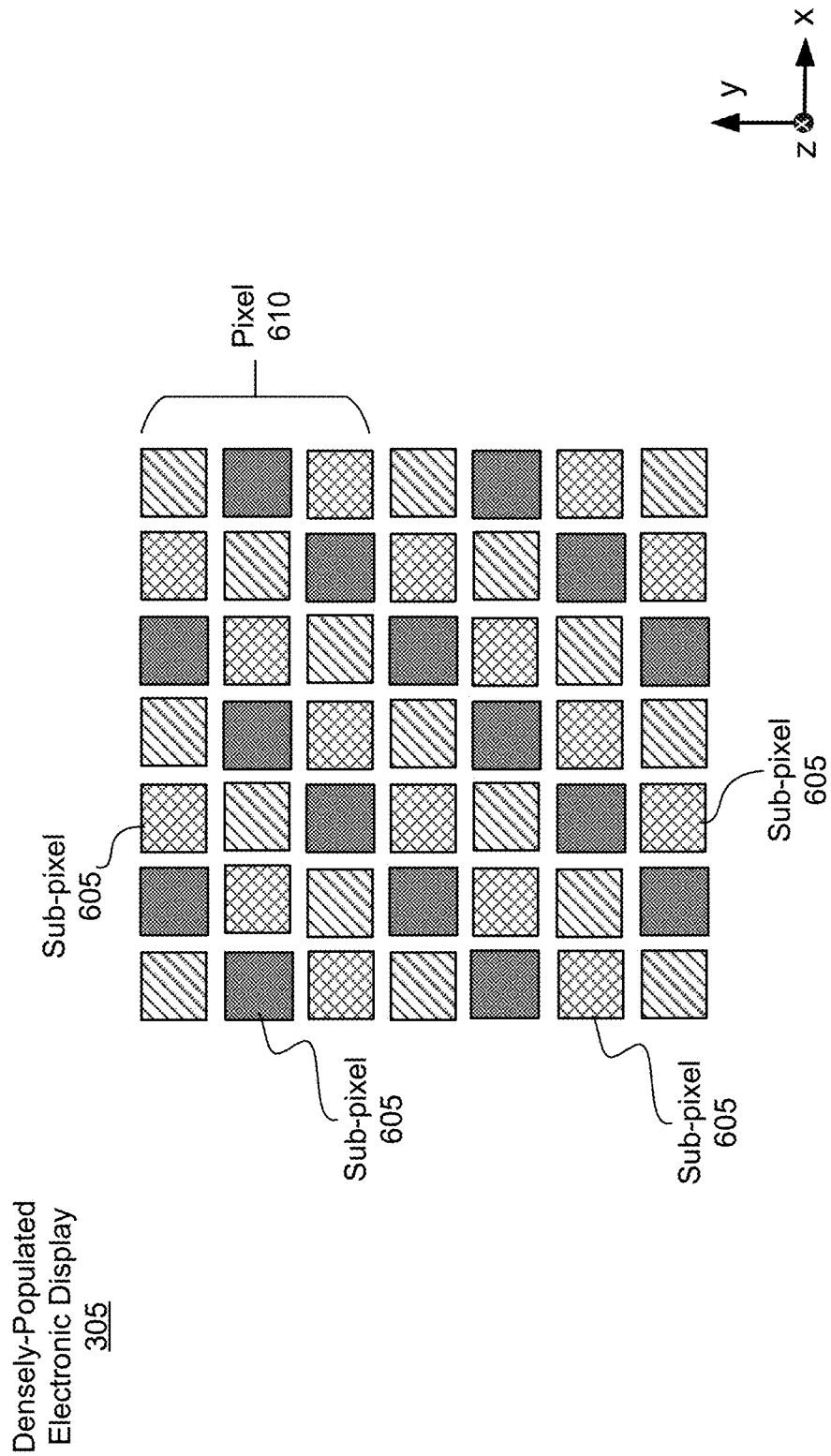
FIG. 6 is an example pixel/sub-pixel arrangement for a portion of a densely-populated electronic display, in accordance with one or more embodiments.

FIG. 6 is an example pixel/sub-pixel arrangement for a portion of the electronic display 305, which is implemented as a densely-populated electronic display, in accordance with one or more embodiments. The densely-populated electronic display 305 comprises a two-dimensional array of sub-pixels 605. Each three consecutive sub-pixels 605 along a dimension of the densely-populated electronic display 305 (e.g., x dimension or y dimension) emit light of three different colors (wavelengths) and compose one pixel 610 of the densely-populated electronic display 305. Each sub-pixel position in the densely-populated electronic display 305 is occupied by one sub-pixel 605 that emits light of a particular color.

A resolution of the densely-populated electronic display 305 (a portion of which is shown in FIG. 6) can be represented as a number of pixels in each dimension of the densely-populated electronic display 305. The resolution of densely-populated electronic display 305 may be further enhanced by shifting directions of light rays of image light emitted from the densely-populated electronic display 305 such that different colored sub-pixels 605 overlay each other at different times during rendering of images. In this manner, a white pixel can be provided at each sub-pixel position of the densely-populated electronic display 305. An additional benefit of the resolution enhancement applied to the densely-populated electronic display 305 is that an optical brightness of the image light perceived at the eye box 325 may be increased for a given optical power due to a reduced area of a white pixel in the densely-populated electronic display 305 as the area of white pixel corresponds to an area of a sub-pixel 605. A further benefit of the resolution enhancement applied to the densely-populated electronic display 305 is the potential for mitigating the effects of "dead" pixels by moving the array of sub-pixels 605 beyond a minimum requirement necessary to enhance the resolution of the densely-populated electronic display 305, or by arranging the array of sub-pixels 605 so that there are some redundant sub-pixels 605.

Figure 7:
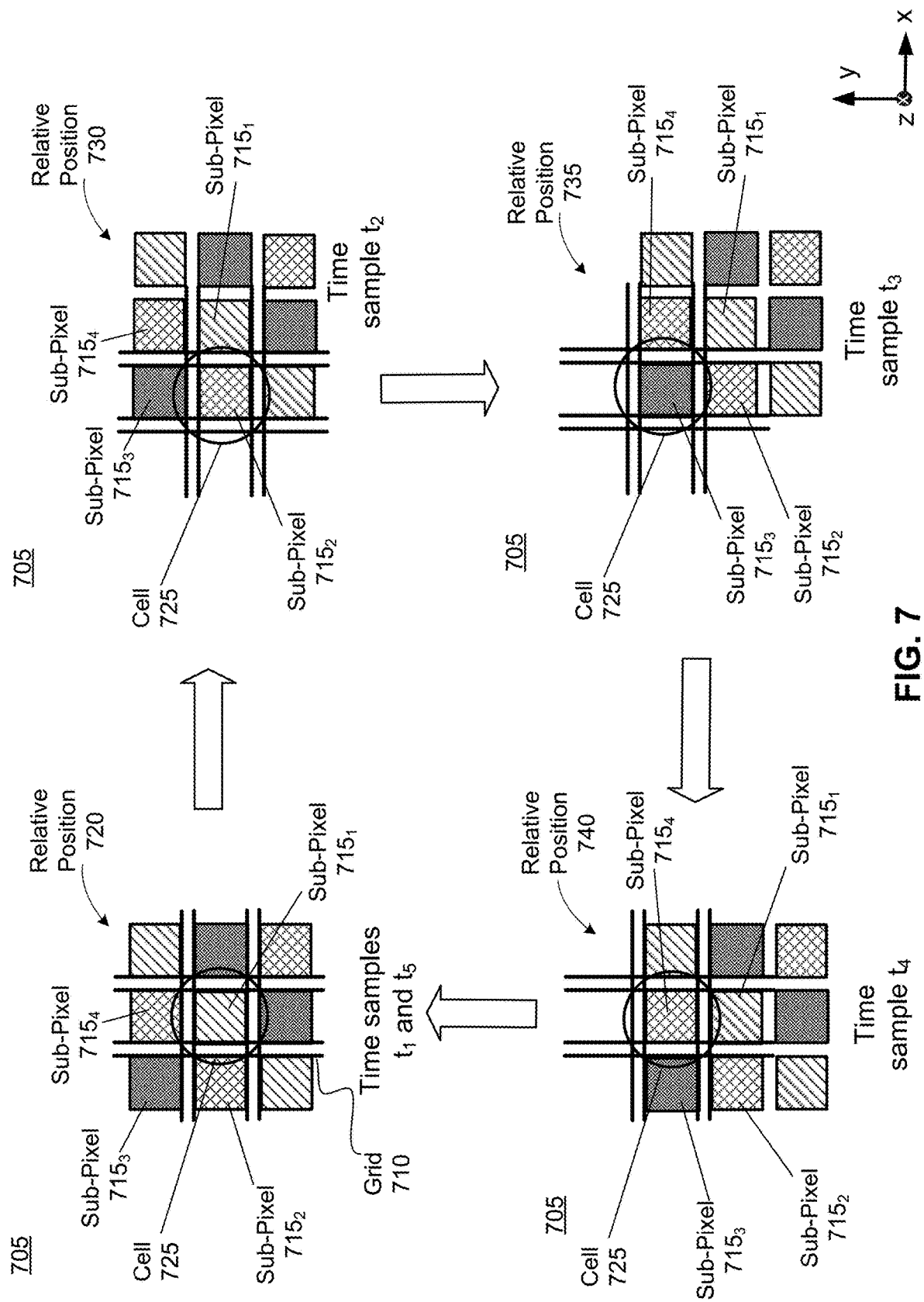
FIG. 7 illustrates an example translational motion path associated with the densely-populated electronic display in FIG. 6 for obtaining a virtual display presented to an eye box having a resolution greater than that of the densely-populated electronic display, in accordance with one or more embodiments.

FIG. 7 illustrates an example translational motion path associated with the densely-populated electronic display 305 for obtaining a virtual display presented to the eye box 325 having a resolution greater than that of the densely-populated electronic display 305, in accordance with one or more embodiments. FIG. 7 shows the example motion path over a plurality of time samples of a time period translational motion for a portion of the densely-populated electronic display 305, e.g., for a sub-pixel array 705 comprising three sub-pixels along both x and y dimensions. Note that a grid 710 represents a static grid of the virtual display and each cell in the grid 710 represents a virtual sub-pixel of the virtual display emitting light of different wavelengths (colors).

In some embodiments, as discussed in conjunction with FIG. 3, the scanning assembly 315 is configured to shift a direction of light rays emitted from the densely-populated electronic display 305 (and the sub-pixel array 705) by shifting a relative position of the densely-populated electronic display 305 to the optical assembly 310 in accordance with emission instructions, e.g., from the controller 320. In this manner, the resolution of the virtual display presented to the eye box 325 is further increased relative to a resolution the densely-populated electronic display 305.

The relative position of the densely-populated electronic display 305 to the optical assembly 310 may be shifted by physically moving the densely-populated electronic display 305 by one sub-pixel position of the densely-populated electronic display 305 (and the sub-pixel array 705) along a first dimension (e.g., along x dimension) at one time sample in the time period and by one sub-pixel position along a second dimension perpendicular to the first dimension (e.g., along y dimension) at another time sample of the time period. Alternatively, the relative position of the densely-populated electronic display 305 to the optical assembly 310 may be shifted by optically moving (e.g., via shifting or rotating one or more components of the optical assembly 310) emitted light rays by one sub-pixel position of the densely-populated electronic display 305 (and the sub-pixel array 705) along the first dimension at one time sample in the time period and by one sub-pixel position along the second dimension at the other time sample of the time period. In some other embodiments, the relative position of the densely-populated electronic display 305 to the optical assembly 310 may be shifted by combining physical movement of the densely-populated electronic display 305 and optical shifting of light rays via one or components of the optical assembly 310. For example, the densely-populated electronic display 305 may be physically shifted by one sub-pixel position of the densely-populated electronic display 305 (and the sub-pixel array 705) along a first dimension (e.g., along x dimension) at one time sample in a time period and by optically moving (e.g., by shifting or rotating one or more components of the optical assembly 310) emitted light rays by one sub-pixel position of the densely-populated electronic display 305 (and the sub-pixel array 705) along a second dimension orthogonal to the first dimension (e.g., along y dimension) at other time sample of the time period.

The shifting of relative position of the densely-populated electronic display 305 (and the sub-pixel array 705) to the optical assembly 310 can be performed for all time samples of the plurality of time samples in the time period such that the sub-pixel array 705 (and densely-populated electronic display 305) is effectively moved in a rotating motion path during the time period. A translational motion of the sub-pixel array 705 (and of the densely-populated electronic display 305) relative to the optical assembly 310 during the time period is illustrated in FIG. 7. Note that a position of the densely-populated electronic display 305 at the end of time period (i.e., when all time samples of the time period lapse) may be the same as a position of the densely-populated electronic display 305 at the beginning of time period before any of the time samples lapses.

At an initial time sample of the time period, e.g., at a time sample $t_1$, sub-pixels $715_1$, $715_2$, $715_3$, $715_4$ of the sub-pixel array 705 (and the densely-populated electronic display 305)

are at an initial position 720 relative to the optical assembly 310. Note that, at the initial relative position 720, the sub-pixel $715_1$ of a first color channel may be located within a cell 725 of the grid 710. At a time sample $t_2$ of the time period immediately following the time sample $t_1$, the relative position of the sub-pixel array 705 (and the densely-populated electronic display 305) to the optical assembly 310 is shifted by one sub-pixel position along x dimension to a new relative position 730. Thus, at the time sample $t_2$, the sub-pixel $715_2$ of a second color channel may be located within the cell 725. Note that sub-pixels that are not illustrated in FIG. 7 for the relative position 730 at the time sample $t_2$ would have filled the apparently empty sub-pixel locations.

At a time sample $t_3$ of the time period immediately following the time sample $t_2$, the relative position of the sub-pixel array 705 (and the densely-populated electronic display 305) is shifted by one sub-pixel position along y dimension to a new relative position 735. Thus, at the time sample $t_2$, the sub-pixel $715_3$ of a third color channel may be located within the cell 725. Note that, when the time sample $t_3$ lapses, a sub-pixel location in the grid 710 associated with the cell 725 has been illuminated by one red sub-pixel, one green sub-pixel, and one blue sub-pixel. At a time sample $t_4$ of the time period immediately following the time sample $t_3$, the relative position of the sub-pixel array 705 (and the densely-populated electronic display 305) to the optical assembly 310 is shifted by one sub-pixel position along x dimension (e.g., in a direction opposite to the shifting at the time sample $t_2$) to a relative position 740 before returning to the initial relative position 720 at a following time sample $t_5$. In some embodiments, the densely-populated electronic display 305 starts rendering a next frame at the time sample $t_4$. Alternatively, the densely-populated electronic display 305 starts rendering a next frame at the time sample $t_5$ that immediately follows the time sample $t_4$ when the relative position of the sub-pixel array 705 (and the densely-populated electronic display 305) to the optical assembly 310 is returned to the initial position 720.

Note that the resolution of the virtual display presented to the eye box 325 in FIG. 3 may be increased from a first resolution of the densely-populated electronic display 305 to a second resolution by overlaying a light ray of the plurality of light rays emitted from a sub-pixel location associated with the cell 725 during one time sample (e.g., time sample $t_1$) with another light ray of the plurality of light rays emitted during another time sample (e.g., time sample $t_2$) from the same sub-pixel location associated with the cell 725. A brightness of a virtual pixel of the virtual display may be also increased by overlaying a light ray of the plurality of light rays emitted from a sub-pixel location associated with the cell 725 during one time sample (e.g., time sample $t_1$) with another light ray of the plurality of light rays emitted during another time sample (e.g., time sample $t_2$) from the same sub-pixel location associated with the cell 725.

When the relative position of the sub-pixel array 705 (and the densely-populated electronic display 305) to the optical assembly 310 is rapidly translated during multiple time samples of each time period as shown in FIG. 7, light of all three colors may be sequentially emitted from each sub-pixel position, e.g., a sub-pixel position associated with the cell 725. In this manner, a whole (white) pixel is formed at the virtual display presented to the eye box 325 in every sub-pixel position. In the example shown in FIG. 7, the resolution of the virtual display presented to the eye box 325 may be greater than the resolution of the densely-populated electronic display 305 by up to two time along both x dimension and y dimension, i.e., the display resolution perceived at the eye box 325 may be increased by up to four times relative to the original resolution of the densely-populated electronic display 305.

FIG. 8 is a flow chart illustrating a process 800 for display resolution enhancement, which may be implemented at the HMD 100 in FIG. 1, in accordance with one or more embodiments. The process 800 of FIG. 8 may be performed by the components of a HMD. Other entities may perform some or all of the steps of the process in other embodiments. Likewise, embodiments may include different and/or additional steps, or perform the steps in different orders.

The HMD generates 810 emission instructions, e.g., via a controller. The controller may be coupled (e.g., electrically or electro-mechanically) to a scanning assembly of a near-eye display assembly integrated into the HMD, wherein the near-eye display assembly further includes an electronic display and an optical assembly coupled to the scanning assembly. The electronic display may emit image light, and the optical assembly may provide optical correction to the image light and direct the image light to an eye box of an eye of a user wearing the HMD. The emission instructions may comprise electrical and/or electro-mechanical signals for controlling operations of one or more micro-actuators (positioners) of the scanning assembly coupled to the electronic display and/or the optical assembly. The one or more micro-actuators (positioners) may change a position of the electronic display and/or at least one component of the optical assembly, based in part on the emission instructions. Alternatively, the emission instructions may comprise electrical signals (e.g., voltage signals) for controlling operations of one or more electro-optical elements (e.g., one or more electro-optical liquid deformable surfaces) of the optical assembly.

The HMD provides 820 (e.g., via the controller) the emission instructions to the scanning assembly to shift a direction of at least one light ray of a plurality of light rays emitted from the electronic display and directed toward an eye box such that a virtual display is presented at the eye box, the virtual display having a second resolution greater than a first resolution of the electronic display. In some embodiments, the electronic display comprises a plurality of pixels, each pixel composed of three sub-pixels emitting light of different colors, each sub-pixel being located in a different cell of a plurality of cells in the electronic display, each cell occupying a two-dimensional area with sub-pixel positions. The scanning assembly may shift the direction of the at least one light ray by shifting a relative position of the electronic display to the optical assembly in accordance with the emission instructions by one sub-pixel position in the cell at each time sample of a plurality of time samples in a time period. In other embodiments, the electronic display comprises a two-dimensional array of sub-pixels, each three consecutive sub-pixels along a dimension of the electronic display emit light of different colors, each sub-pixel position in the electronic display being occupied by one of the sub-pixels in the array. The scanning assembly may shift the direction of the at least one light ray by shifting a relative position of the electronic display to the optical assembly in accordance with the emission instructions by one sub-pixel position along a first dimension at a first time sample of a plurality of time samples in a time period and by one sub-pixel position along a second dimension perpendicular to the first dimension at a second time sample of the time period.

System Environment

Figure 9:
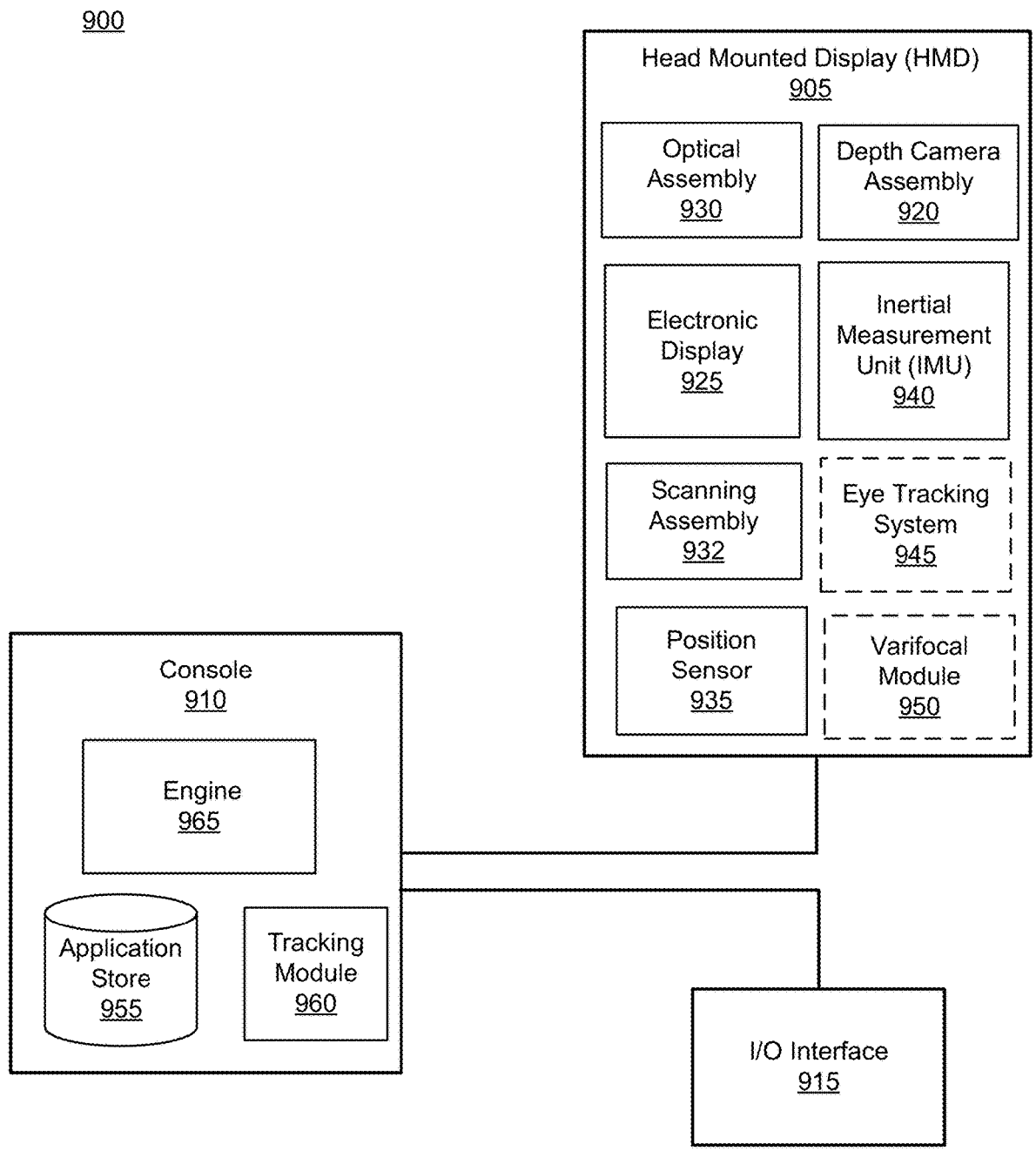
FIG. 9 is a block diagram of a HMD system in which a console operates, in accordance with one or more embodiments.

FIG. 9 is a block diagram of one embodiment of a HMD system 900 in which a console 910 operates. The HMD system 900 may operate in an artificial reality system. The HMD system 900 shown by FIG. 9 comprises a HMD 905 and an input/output (I/O) interface 915 that is coupled to the console 910. While FIG. 9 shows an example HMD system 900 including one HMD 905 and on I/O interface 915, in other embodiments any number of these components may be included in the HMD system 900. For example, there may be multiple HMDs 905 each having an associated I/O interface 915, with each HMD 905 and I/O interface 915 communicating with the console 910. In alternative configurations, different and/or additional components may be included in the HMD system 900. Additionally, functionality described in conjunction with one or more of the components shown in FIG. 9 may be distributed among the components in a different manner than described in conjunction with FIG. 9 in some embodiments. For example, some or all of the functionality of the console 910 is provided by the HMD 905.

The HMD 905 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 905, the console 910, or both, and presents audio data based on the audio information. The HMD 905 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 905 may be the HMD 100 described above in conjunction with FIG. 1.

The HMD 905 includes a DCA 920, an electronic display 925, an optical assembly 930, a scanning assembly 932, one or more position sensors 935, an IMU 940, an optional eye tracking system 945, and an optional varifocal module 950. Some embodiments of the HMD 905 have different components than those described in conjunction with FIG. 9. Additionally, the functionality provided by various components described in conjunction with FIG. 9 may be differently distributed among the components of the HMD 905 in other embodiments.

The DCA 920 captures data describing depth information of a local area surrounding some or all of the HMD 905. The DCA 920 can compute the depth information using the data (e.g., based on a captured portion of a structured light pattern), or the DCA 920 can send this information to another device such as the console 910 that can determine the depth information using the data from the DCA 920.

The electronic display 925 displays two-dimensional or three-dimensional images to the user in accordance with data received from the console 910. In various embodiments, the electronic display 925 comprises a single electronic display or multiple electronic displays (e.g., a display for each eye of a user). Examples of the electronic display 925 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

In accordance with embodiments of the present disclosure, the electronic display 925 has a first resolution of pixels. In some embodiments, the electronic display 925 comprises a plurality of pixels, each pixel composed of three sub-pixels emitting light of different colors, each sub-pixel being located in a different cell of a plurality of cells in the electronic display, each cell occupying a two-dimensional area with sub-pixel positions. Alternatively, the electronic display 925 may comprise a two-dimensional array of sub-pixels, each three consecutive sub-pixels along a dimension of the electronic display emit light of different colors, each sub-pixel position in the electronic display being occupied by one of the sub-pixels in the array. The electronic display 925 may be an embodiment of the electronic display 215 of FIG. 2 and/or the electronic display 305 of FIG. 3.

The optical assembly 930 magnifies image light received from the electronic display 925, corrects optical errors associated with the image light, and presents the corrected image light to a user of the HMD 905. The optical assembly 930 includes a plurality of optical elements. Example optical elements included in the optical assembly 930 include: an aperture, a Fresnel lens, a convex lens, a concave lens, a filter, a reflecting surface, or any other suitable optical element that affects image light. Moreover, the optical assembly 930 may include combinations of different optical elements. In some embodiments, one or more of the optical elements in the optical assembly 930 may have one or more coatings, such as partially reflective or anti-reflective coatings.

Magnification and focusing of the image light by the optical assembly 930 allows the electronic display 925 to be physically smaller, weigh less and consume less power than larger displays. Additionally, magnification may increase the field-of-view of the content presented by the electronic display 925. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 930 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 925 for display is pre-distorted, and the optical assembly 930 corrects the distortion when it receives image light from the electronic display 925 generated based on the content.

In accordance with embodiments of the present disclosure, the optical assembly 930 is configured to control a field of view at a user's eye box and direct a plurality of light rays emitting from the electronic display 925 toward the eye box. In some embodiments, operation of one or more electro-optical elements (e.g., one or more electro-optical liquid deformable surfaces) of the optical assembly 930 are controlled to shift directions of light rays emitted from the electronic display 925, based in part on emission instructions, such that a virtual display is presented to the eye box, the virtual display having a second resolution greater than the first resolution of the electronic display 925. In other embodiments, one or more components of the optical assembly 930 may be rotated around an axis to shift the directions of the light rays, based in part on the emission instructions.

In some embodiments, the optical assembly 930 may represent the optical assembly 220 of FIG. 2 and/or the optical assembly 310 of FIG. 3.

The scanning assembly 932 is coupled to at least one of the electronic display 925 and the optical assembly 930. The scanning assembly 932 is configured to shift the directions of the light rays in accordance with the emission instructions such that the virtual display is presented to the eye box, the virtual display having the second resolution greater than the first resolution of the electronic display 925. In some embodiments, the scanning assembly 932 includes one or more micro-actuators (positioners) interfaced with the electronic display 925 and/or the optical assembly 930. The one or more micro-actuators of the scanning assembly 932 may be instructed to shift the relative position of the electronic display to the optical assembly during a time period, based in part on the emission instructions. In some embodiments, the scanning assembly 932 is configured to shift the directions of the light rays by shifting a relative position of the electronic display 925 to the optical assembly 930 in accordance with the emission instructions at each time sample of a plurality of time samples in the time period. The scanning assembly 932 may shift the directions of the light rays by shifting a relative position of the electronic display 925 to the optical assembly 930 in accordance with the emission instructions by one sub-pixel position in the cell at each time sample in the time period. Alternatively, the scanning assembly 932 may shift the directions of the light rays by shifting a relative position of the electronic display 925 to the optical assembly 930 in accordance with the emission instructions by one sub-pixel position along a first dimension at a first time sample in the time period and by one sub-pixel position along a second dimension perpendicular to the first dimension at a second time sample of the time period. In an exemplary embodiment, the scanning assembly 932 is configured to shift a direction of at least one of the light rays in accordance with the emission instructions, wherein the second resolution of the virtual display presented to the eye box may be increased by at least one virtual pixel relative to the first resolution of the electronic display 925. The scanning assembly 932 may be an embodiment of the scanning assembly 315 of FIG. 3.

The IMU 940 is an electronic device that generates data indicating a position of the HMD 905 based on measurement signals received from one or more of the position sensors 935 and from depth information received from the DCA 920. A position sensor 935 generates one or more measurement signals in response to motion of the HMD 905. Examples of position sensors 935 include: one or more accelerometers, one or more gyroscopes, one or more magnetometers, another suitable type of sensor that detects motion, a type of sensor used for error correction of the IMU 940, or some combination thereof. The position sensors 935 may be located external to the IMU 940, internal to the IMU 940, or some combination thereof.

Based on the one or more measurement signals from one or more position sensors 935, the IMU 940 generates data indicating an estimated current position of the HMD 905 relative to an initial position of the HMD 905. For example, the position sensors 935 include multiple accelerometers to measure translational motion (forward/back, up/down, left/right) and multiple gyroscopes to measure rotational motion (e.g., pitch, yaw, roll). In some embodiments, the position sensors 935 may represent the position sensors 135 of FIG. 1. In some embodiments, the IMU 940 rapidly samples the measurement signals and calculates the estimated current position of the HMD 905 from the sampled data. For example, the IMU 940 integrates the measurement signals received from the accelerometers over time to estimate a velocity vector and integrates the velocity vector over time to determine an estimated current position of a reference point on the HMD 905. Alternatively, the IMU 940 provides the sampled measurement signals to the console 910, which interprets the data to reduce error. The reference point is a point that may be used to describe the position of the HMD 905. The reference point may generally be defined as a point in space or a position related to the HMD's 905 orientation and position.

The IMU 940 receives one or more parameters from the console 910. The one or more parameters are used to maintain tracking of the HMD 905. Based on a received parameter, the IMU 940 may adjust one or more IMU parameters (e.g., sample rate). In some embodiments, certain parameters cause the IMU 940 to update an initial position of the reference point so it corresponds to a next position of the reference point. Updating the initial position of the reference point as the next calibrated position of the reference point helps reduce accumulated error associated with the current position estimated the IMU 940. The accumulated error, also referred to as drift error, causes the estimated position of the reference point to "drift" away from the actual position of the reference point over time. In some embodiments of the HMD 905, the IMU 940 may be a dedicated hardware component. In other embodiments, the IMU 940 may be a software component implemented in one or more processors. In some embodiments, the IMU 940 may represent the IMU 130 of FIG. 1.

In some embodiments, the eye tracking system 945 is integrated into the HMD 905. The eye tracking system 945 determines eye tracking information associated with an eye of a user wearing the HMD 905. The eye tracking information determined by the eye tracking system 945 may comprise information about an orientation of the user's eye, i.e., information about an angle of an eye-gaze. In some embodiments, the eye tracking system 945 is integrated into the optical assembly 930. An embodiment of the eye-tracking system 945 may comprise an illumination source and an imaging device (camera).

In some embodiments, the varifocal module 950 is further integrated into the HMD 905. The varifocal module 950 may be coupled to the eye tracking system 945 to obtain eye tracking information determined by the eye tracking system 945. The varifocal module 950 may be configured to adjust focus of one or more images displayed on the electronic display 925, based on the determined eye tracking information obtained from the eye tracking system 945. In this way, the varifocal module 950 can mitigate vergence-accommodation conflict in relation to image light. The varifocal module 950 can be interfaced (e.g., either mechanically or electrically) with at least one of the electronic display 925, and at least one optical element of the optical assembly 930. Then, the varifocal module 950 may be configured to adjust focus of the one or more images displayed on the electronic display 925 by adjusting position of at least one of the electronic display 925 and the at least one optical element of the optical assembly 930, based on the determined eye tracking information obtained from the eye tracking system 945. By adjusting the position, the varifocal module 950 varies focus of image light output from the electronic display 925 towards the user's eye. The varifocal module 950 may be also configured to adjust resolution of the images displayed on the electronic display 925 by performing foveated rendering of the displayed images, based at least in part on the determined eye tracking information obtained from the eye tracking system 945. In this case, the varifocal module 950 provides appropriate image signals to the electronic display 925. The varifocal module 950 provides image signals with a maximum pixel density for the electronic display 925 only in a foveal region of the user's eye-gaze, while providing image signals with lower pixel densities in other regions of the electronic display 925. In one embodiment, the varifocal module 950 may utilize the depth information obtained by the DCA 920 to, e.g., generate content for presentation on the electronic display 925.

The I/O interface 915 is a device that allows a user to send action requests and receive responses from the console 910. An action request is a request to perform a particular action. For example, an action request may be an instruction to start or end capture of image or video data or an instruction to perform a particular action within an application. The I/O interface 915 may include one or more input devices. Example input devices include: a keyboard, a mouse, a game controller, or any other suitable device for receiving action requests and communicating the action requests to the console 910. An action request received by the I/O interface 915 is communicated to the console 910, which performs an action corresponding to the action request. In some embodiments, the I/O interface 915 includes an IMU 940 that captures IMU data indicating an estimated position of the I/O interface 915 relative to an initial position of the I/O interface 915. In some embodiments, the I/O interface 915 may provide haptic feedback to the user in accordance with instructions received from the console 910. For example, haptic feedback is provided when an action request is received, or the console 910 communicates instructions to the I/O interface 915 causing the I/O interface 915 to generate haptic feedback when the console 910 performs an action.

The console 910 provides content to the HMD 905 for processing in accordance with information received from one or more of: the DCA 920, the HMD 905, and the I/O interface 915. In the example shown in FIG. 9, the console 910 includes an application store 955, a tracking module 960, and an engine 965. Some embodiments of the console 910 have different modules or components than those described in conjunction with FIG. 9. Similarly, the functions further described below may be distributed among components of the console 910 in a different manner than described in conjunction with FIG. 9.

The application store 955 stores one or more applications for execution by the console 910. An application is a group of instructions, that when executed by a processor, generates content for presentation to the user. Content generated by an application may be in response to inputs received from the user via movement of the HMD 905 or the I/O interface 915. Examples of applications include: gaming applications, conferencing applications, video playback applications, or other suitable applications.

The tracking module 960 calibrates the HMD system 900 using one or more calibration parameters and may adjust one or more calibration parameters to reduce error in determination of the position of the HMD 905 or of the I/O interface 915. For example, the tracking module 960 communicates a calibration parameter to the DCA 920 to adjust the focus of the DCA 920 to more accurately determine positions of structured light elements captured by the DCA 920. Calibration performed by the tracking module 960 also accounts for information received from the IMU 940 in the HMD 905 and/or an IMU 940 included in the I/O interface 915. Additionally, if tracking of the HMD 905 is lost (e.g., the DCA 920 loses line of sight of at least a threshold number of structured light elements), the tracking module 960 may re-calibrate some or all of the HMD system 900.

The tracking module 960 tracks movements of the HMD 905 or of the I/O interface 915 using information from the DCA 920, the one or more position sensors 935, the IMU 940 or some combination thereof. For example, the tracking module 950 determines a position of a reference point of the HMD 905 in a mapping of a local area based on information from the HMD 905. The tracking module 960 may also determine positions of the reference point of the HMD 905 or a reference point of the I/O interface 915 using data indicating a position of the HMD 905 from the IMU 940 or using data indicating a position of the I/O interface 915 from an IMU 940 included in the I/O interface 915, respectively. Additionally, in some embodiments, the tracking module 960 may use portions of data indicating a position or the HMD 905 from the IMU 940 as well as representations of the local area from the DCA 920 to predict a future location of the HMD 905. The tracking module 960 provides the estimated or predicted future position of the HMD 905 or the I/O interface 915 to the engine 955.

The engine 965 generates a 3D mapping of the area surrounding some or all of the HMD 905 (i.e., the "local area") based on information received from the HMD 905. In some embodiments, the engine 965 determines depth information for the 3D mapping of the local area based on information received from the DCA 920 that is relevant for techniques used in computing depth. The engine 965 may calculate depth information using one or more techniques in computing depth from structured light. In various embodiments, the engine 965 uses the depth information to, e.g., update a model of the local area, and generate content based in part on the updated model.

The engine 965 also executes applications within the HMD system 900 and receives position information, acceleration information, velocity information, predicted future positions, or some combination thereof, of the HMD 905 from the tracking module 960. Based on the received information, the engine 965 determines content to provide to the HMD 905 for presentation to the user. For example, if the received information indicates that the user has looked to the left, the engine 965 generates content for the HMD 905 that mirrors the user's movement in a virtual environment or in an environment augmenting the local area with additional content. Additionally, the engine 965 performs an action within an application executing on the console 910 in response to an action request received from the I/O interface 915 and provides feedback to the user that the action was performed. The provided feedback may be visual or audible feedback via the HMD 905 or haptic feedback via the I/O interface 915.

In some embodiments, based on the eye tracking information (e.g., orientation of the user's eye) received from the eye tracking system 945, the engine 965 determines resolution of the content provided to the HMD 905 for presentation to the user on the electronic display 925. The engine 965 provides the content to the HMD 905 having a maximum pixel resolution on the electronic display 925 in a foveal region of the user's gaze, whereas the engine 965 provides a lower pixel resolution in other regions of the electronic display 925, thus achieving less power consumption at the HMD 905 and saving computing cycles of the console 910 without compromising a visual experience of the user. In some embodiments, the engine 965 can further use the eye tracking information to adjust where objects are displayed on the electronic display 925 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display assembly comprising:
   a display having a first resolution and configured to emit image light for presentation to an eye box; and
   a scanning assembly configured to repeatedly shift directions of a plurality of light rays of the image light to generate a shifted version of the light rays forming a virtual display with a plurality of virtual sub-pixels presented to the eye box having a second resolution greater than the first resolution.

2. The near-eye display assembly of claim 1, wherein the display comprises a plurality of pixels, each pixel composed of three sub-pixels emitting light of different colors, each sub-pixel being located in a different cell of a plurality of cells in the display, each cell occupying a two-dimensional area with sub-pixel positions.

3. The near-eye display assembly of claim 1, wherein the display comprises a two-dimensional (2D) array of sub-pixels, each three consecutive sub-pixels in the 2D array that are positioned along a same dimension of the display emit light of different colors, each sub-pixel position in the display being occupied by one of the sub-pixels in the 2D array.

4. The near-eye display assembly of claim 1, further comprising:
   an optical assembly configured to control a field of view at the eye box and direct the image light toward the eye box.

5. The near-eye display assembly of claim 4, wherein the scanning assembly is further configured to repeatedly shift the directions of the light rays by repeatedly shifting a relative position of the display to the optical assembly by one sub-pixel position of the display.

6. The near-eye display assembly of claim 4, wherein the scanning assembly is further configured to repeatedly shift the directions of the light rays by shifting a relative position of the display to the optical assembly by one sub-pixel position of the display along a first dimension at a first time sample of a time period and by one sub-pixel position of the display along a second dimension perpendicular to the first dimension at a second time sample of the time period.

7. The near-eye display assembly of claim 6, wherein a resolution of the virtual display is increased by overlaying a light ray of the plurality of light rays emitted from a sub-pixel of the display during the first time sample with another light ray of the plurality of light rays emitted during the second time sample from another sub-pixel of the display.

8. The near-eye display assembly of claim 6, wherein a brightness of a virtual pixel of the virtual display is increased by overlaying a light ray of the plurality of light rays emitted from a sub-pixel of the display during the first time sample with another light ray of the plurality of light rays emitted during the second time sample from another sub-pixel of the display.

9. The near-eye display assembly of claim 4, wherein the scanning assembly includes one or more micro-actuators interfaced with the display, and the near-eye display assembly further includes a controller coupled to the scanning assembly, the controller configured to:
   instruct the one or more micro-actuators to repeatedly shift a relative position of the display to the optical assembly.

10. The near-eye display assembly of claim 4, further comprising:
    a controller coupled to the optical assembly, the controller configured to control operation of one or more electro-optical elements of the optical assembly to repeatedly shift the directions of the light rays.

11. The near-eye display assembly of claim 10, wherein the controller is further configured to repeatedly shift the directions of the light rays by repeatedly changing a refractive index of the one or more electro-optical elements.

12. The near-eye display assembly of claim 1, further comprising:
a controller configured to instruct the scanning assembly to rotate a prism around an optical axis to repeatedly shift the directions of the light rays.

13. The near-eye display assembly of claim 1, further comprising:
a controller configured to instruct the scanning assembly to rotate a collimation element around an optical axis to repeatedly shift the directions of the light rays.

14. The near-eye display assembly of claim 1, further comprising:
a controller configured to control operation of the scanning assembly to control a brightness of a virtual pixel of the virtual display based on a number of times over a time period a location at the eye box corresponding to the virtual pixel receives one or more light rays of the shifted version of the light rays associated with a particular sub-pixel color.

15. A method comprising:
generating emission instructions; and
providing the emission instructions to a scanning assembly to repeatedly shift directions of a plurality of light rays of image light emitted from a display having a first resolution to generate a shifted version of the light rays forming a virtual display with a plurality of virtual sub-pixels presented to an eye box having a second resolution greater than the first resolution.

16. The method of claim 15, further comprising:
providing the emission instructions to the scanning assembly to repeatedly shift the directions of the light rays by repeatedly shifting a relative position of the display to an optical assembly by one sub-pixel position of the display.

17. The method of claim 15, further comprising:
providing the emission instructions to the scanning assembly to repeatedly shift the directions of the light rays by shifting a relative position of the display to an optical assembly by one sub-pixel position along a first dimension at a first time sample of a time period and by one sub-pixel position along a second dimension perpendicular to the first dimension at a second time sample of the time period.

18. The method of claim 15, wherein the scanning assembly includes one or more micro-actuators interfaced with the display, and the method further comprises:
providing the emission instructions to the one or more micro-actuators to repeatedly shift a relative position of the display to an optical assembly.

19. The method of claim 15, further comprising:
repeatedly changing a refractive index of one or more electro-optical elements of an optical assembly to repeatedly shift the directions of the light rays.

20. A head-mounted display (HMD) comprising:
a display having a first resolution and configured to emit image light for presentation to an eye box of the HMD corresponding to a location of a user's eye; and
a scanning assembly configured to repeatedly shift directions of a plurality of light rays of the image light to generate a shifted version of the light rays forming a virtual display with a plurality of virtual sub-pixels presented to the eye box having a second resolution greater than the first resolution.

\* \* \* \* \*